United States Patent
Van Hall et al.

(10) Patent No.: US 7,095,894 B2
(45) Date of Patent: Aug. 22, 2006

(54) METHOD AND COMPUTER PROGRAM PRODUCT FOR RECOGNIZING ITALICIZED TEXT

(75) Inventors: Richard C. Van Hall, Owego, NY (US); Michael P. Welch, Endicott, NY (US)

(73) Assignee: Lockheed Martin Corporation, Bethesda, MD (US)

(*) Notice: Subject to any disclaimer, the term of this patent is extended or adjusted under 35 U.S.C. 154(b) by 744 days.

(21) Appl. No.: 10/234,571

(22) Filed: Sep. 4, 2002

(65) Prior Publication Data
US 2004/0042664 A1 Mar. 4, 2004

(51) Int. Cl.
*G06K 9/62* (2006.01)

(52) U.S. Cl. ..................... 382/224

(58) Field of Classification Search ............ 382/224
See application file for complete search history.

(56) References Cited

U.S. PATENT DOCUMENTS

| | | | |
|---|---|---|---|
| 3,967,243 A | 6/1976 | Kawa | |
| 4,155,072 A | 5/1979 | Kawa | |
| 4,562,594 A * | 12/1985 | Bednar et al. | 382/174 |
| 4,757,551 A | 7/1988 | Kobayashi et al. | |
| 4,845,768 A * | 7/1989 | Kochert et al. | 382/290 |
| 5,113,453 A * | 5/1992 | Simon | 382/202 |
| 5,159,644 A | 10/1992 | Martin et al. | |
| 5,315,668 A * | 5/1994 | O'Hair | 382/159 |
| 5,325,447 A | 6/1994 | Vogt, III | |
| 5,408,540 A | 4/1995 | Zlotnick | |
| 5,515,455 A | 5/1996 | Govindaraju et al. | |
| 5,570,435 A * | 10/1996 | Bloomberg et al. | 382/283 |
| 5,579,418 A | 11/1996 | Williams et al. | |
| 5,615,285 A | 3/1997 | Beernink | |
| 5,633,954 A | 5/1997 | Gupta et al. | |
| 5,642,288 A * | 6/1997 | Leung et al. | 700/223 |
| 5,668,891 A | 9/1997 | Fan et al. | |
| 5,689,584 A * | 11/1997 | Kobayashi | 382/190 |
| 5,883,974 A | 3/1999 | Fan et al. | |

* cited by examiner

*Primary Examiner*—Joseph Mancuso
*Assistant Examiner*—Jonathan Schaffer
(74) *Attorney, Agent, or Firm*—Tarolli, Sundheim, Covell & Tummino LLP

(57) ABSTRACT

A method and computer program product are disclosed for recognizing italic text in an optical character recognition system. A plurality of digital images of alphanumeric characters are created from a block of text, each comprising a plurality of rows of digital pixels. The digital images are preprocessed such that each image is normalized to equal size and the pixels within each image have a first value, such as "black," or a second value, such as "white."

The position of the left-most pixel with a first value in each row is determined for each image. The position of each left-most pixel with a first value is recorded as an ordered pair including the row number and ordinal position within the row. A best-fit line and a corresponding slope are calculated for the ordered pairs via linear regression. The calculated slope is then compared to a predetermined threshold.

10 Claims, 4 Drawing Sheets

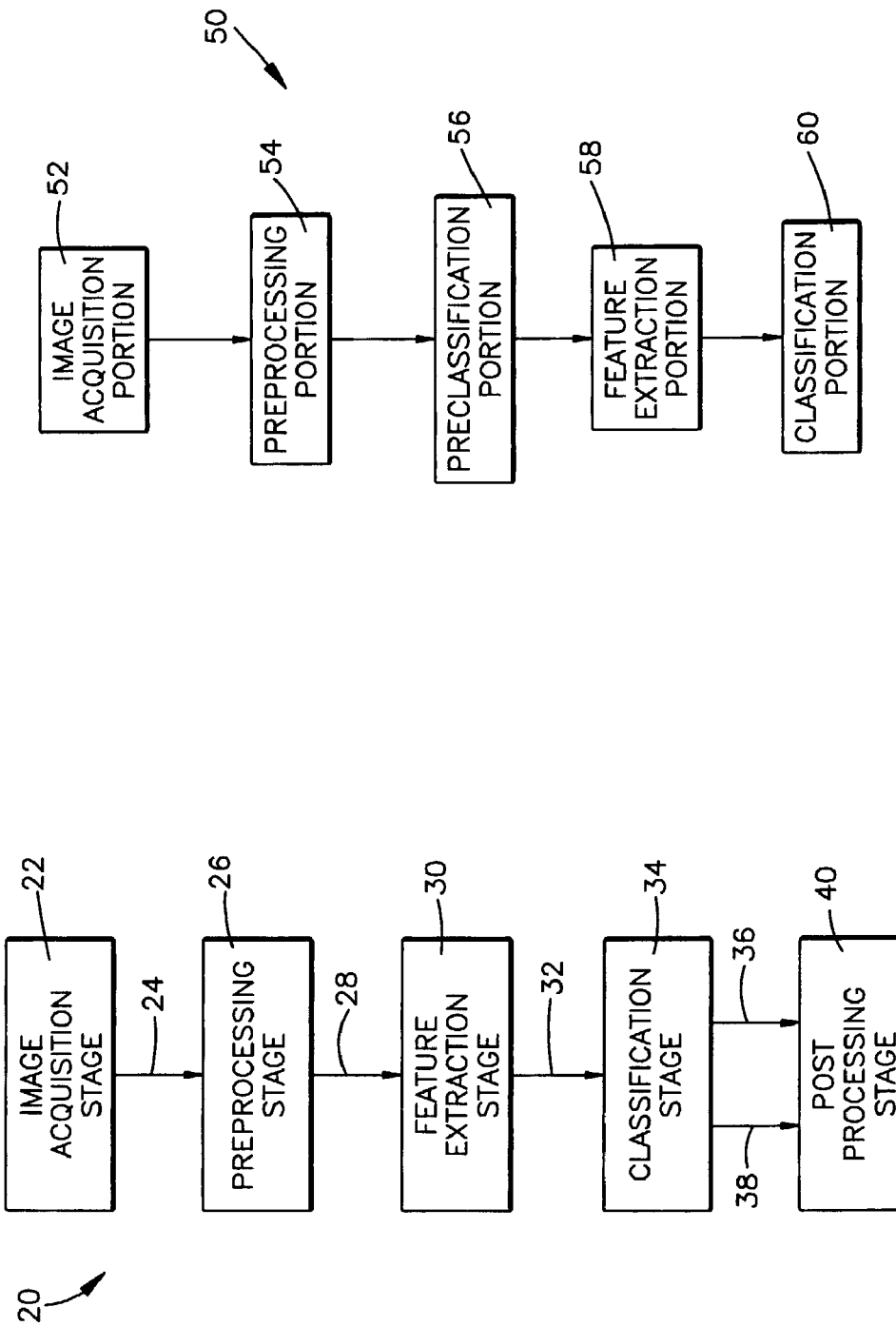

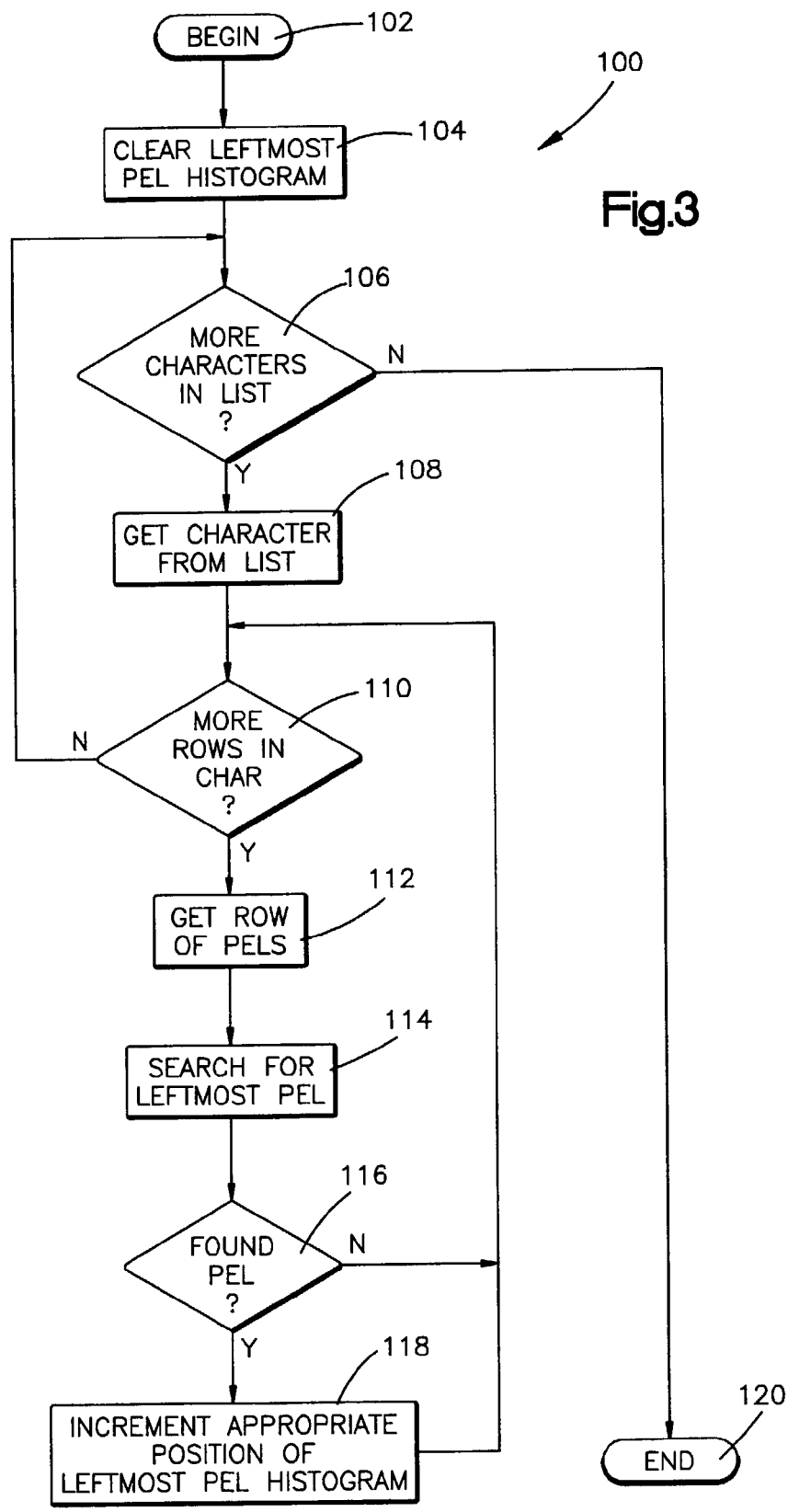

US 7,095,894 B2

METHOD AND COMPUTER PROGRAM PRODUCT FOR RECOGNIZING ITALICIZED TEXT

BACKGROUND OF THE INVENTION

1. Technical Field

The invention relates to a system for recognizing italicized text in an optical character recognition (OCR) system. OCR systems rely on pattern recognition devices (classifiers) for character recognition.

2. Description of the Prior Art

Optical character recognition (OCR) is the process of transforming written or printed text into digital information. Pattern recognition classifiers are used in sorting scanned characters into a number of output classes. A typical prior art classifier is trained over a plurality of output classes using a set of training samples. The training samples are processed, data relating to features of interest are extracted, and training parameters are derived from this feature data. During operation, the system receives an input image associated with one of a plurality of classes. The relationship of the image to each class is analyzed via a classification technique based upon the training parameters. From this analysis, the system produces an output class and an associated confidence value.

Characters with abnormal posture, such as italicized characters, can distort the features used in image recognition. While such characters may be treated separately from the standard posture of the character for the purposes of classification, this greatly increases the number of necessary output classes and unnecessarily retards system performance. Accordingly, it would be useful to develop less resource-intensive methods of detecting text of abnormal posture.

STATEMENT OF THE INVENTION

In accordance with one aspect of the present invention, a method is disclosed for recognizing italic text in an optical character recognition system. A plurality of digital images of alphanumeric characters are created from a block of text, each comprising a plurality of rows of digital pixels. The digital images are preprocessed such that each image is normalized to equal size and the pixels within each image have a first value, such as "black," or a second value, such as "white."

The position of the left-most pixel with a first value in each row is determined for each image. The position of each left-most pixel with a first value is recorded as an ordered pair including the row number and ordinal position within the row. A best-fit line with a corresponding slope is calculated for the ordered pairs via linear regression. The calculated slope is then compared to a predetermined threshold.

In accordance with another aspect of the present invention, a computer program product operative in a data processing system is disclosed for detecting italicized text. An image acquisition portion creates a plurality of digital characters of alphanumeric images from a block of text, each comprising a plurality of rows of digital pixels. A preprocessing portion preprocesses the digital images such that each image is normalized to equal size and the pixels within each image have a first value, such as "black" or and second value, such as "white".

A classification portion determines the position of the left-most pixel with a first value in each row for each image. It then records the position of each left-most pixel with a first value as a ordered pair including the row number and ordinal position within the row and calculates a best-fit line with a corresponding slope of the ordered pairs through linear regression. It then compares the calculated slope to a predetermined threshold.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a functional schematic of a modular classification architecture;

FIG. 2 is a functional schematic of an image recognition classifier using an example embodiment of the claimed preclassification system;

FIG. 3 is a flow diagram illustrating the process of scanning the left-edge of each character to obtain the position data;

DETAILED DESCRIPTION OF THE INVENTION

Figure 6:
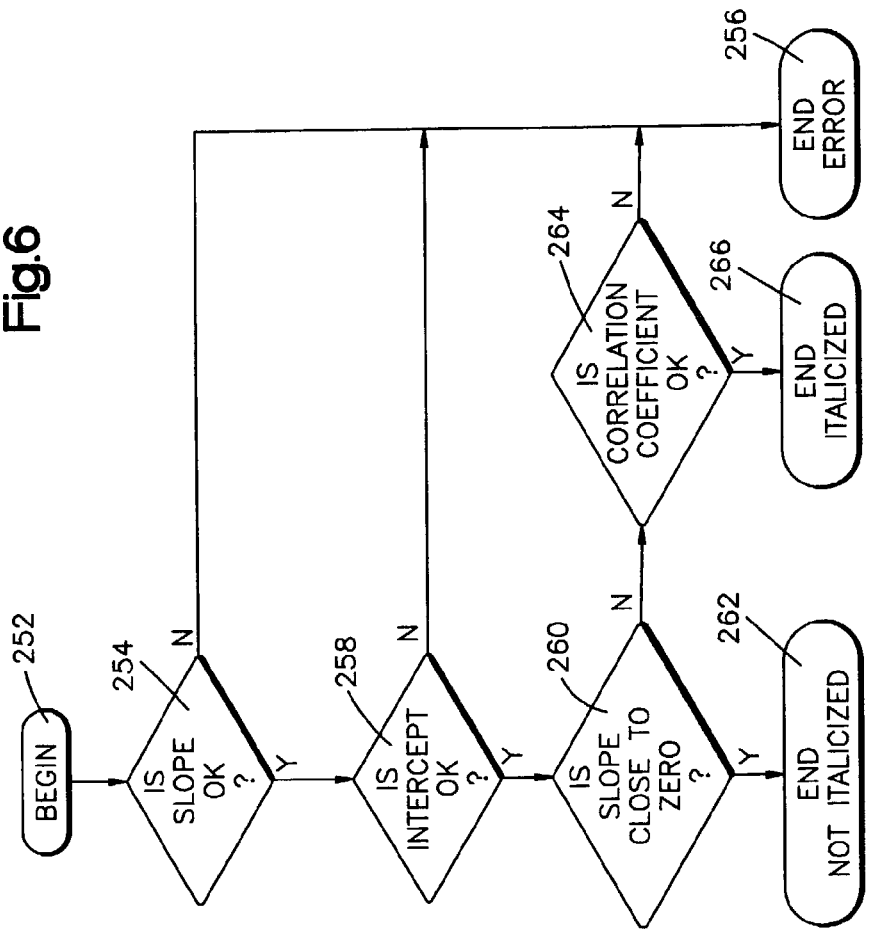
FIG. 6 is a flow diagram illustrating an example verification process for the calculated regression values.

It should be noted that the present invention and the image recognition classifier to which the present invention is applied will be usually be implemented as a computer program. Such a program may simulate, at least in part, the functioning of a neural network. As the present invention will be implemented as part of an optical character recognition system, a basic description of such a classification system would be useful in illustrating the claimed invention.

FIG. 1 illustrates a classification system 20 that might be used in association with the present invention. As stated above, the system is usually implemented as a software program. Therefore, the structures described herein may be considered to refer to individual modules and tasks within that program.

Focusing on the function of a classification system 20 compatible with the present invention, the classification process begins at an image acquisition stage 22 with the acquisition of an input image. The image 24 is then sent to a preprocessing stage 26, where the image 24 is preprocessed to enhance the image, locate portions of interest, eliminate obvious noise, and otherwise prepare the image for further processing.

The selected portions of the image 28 are then sent to a feature extraction stage 30. Feature extraction converts the image 28 into a vector 32 of numerical measurements, referred to as feature variables. The vector 32 is formed from a sequence of measurements performed on the image. Many feature types exist and are selected based on the characteristics of the recognition problem.

The extracted feature vector 32 is then provided to a classification stage 34. The classification stage 34 relates the feature vector 32 to the most likely output class, and determines a confidence value 36 that the image is a member of the selected class. This is accomplished by a statistical or neural network classifier. Mathematical classification techniques convert the feature vector input to a recognition result 38 and an associated confidence value 36. The confidence value 36 provides an external ability to assess the correctness of the classification. For example, a classifier output may have a value between zero and one, with one representing maximum certainty. Finally, the recognition result 38 is sent to a post-processing stage 40. The post-processing stage 30 applies the recognition result 38 provided by the classification stage 34 to a real-world problem.

The present invention relates to the classification stage. Specifically, the present invention preclassifies blocks of text within a source to determine if the text is italicized. Where the text is found to be italicized, modifications can be made to the segmentation process, the classification process, or the base image itself to account for the italics effect.

FIG. 2 illustrates an optical character recognition classifier 50 utilizing an example embodiment of the preclassification system of the present invention. The process begins in the image acquisition portion 52, where the system scans a block of text into a digital image. The scanned image is passed to the preprocessing portion 54 of the system. In the preprocessing portion 54, the image will be transformed into a bilevel image and segmented to isolate individual alphanumeric characters.

The segmented characters are then normalized to a common size. Each character is proportionately expanded or contracted to a matrix of pixels of a specified number of rows and columns. Accordingly, any character can be described by a series of ones and zeros within a standard matrix.

Within the preclassification portion 56, the matrix representing each character is scanned to determined the position of the left-most "dark" pixel, or pel, in each row. This position is saved in a two-dimensional leftmost pel histogram. The pel histogram is a matrix, of the same dimensions as the normalized characters, capable of storing an integer at each position. For each character scanned by the system, the pixel position containing a left-most pel for its row is recorded by adding one to the corresponding position on the pel histogram.

After all of the characters have been scanned, the pel histogram is filtered to eliminate unhelpful data, such as the left edges of extraneous portions of a character (i.e. the left-most edge of the lower portion of the character "4"). Such a filter can take many forms. The example preclassifier will clear all values in the pel histogram with a column value greater than one-half of the total number of columns. Put simply, the right half of the pel histogram will be cleared prior to further analysis. Other methods of filtering unhelpful data may be used within the spirit of the present invention.

The data within the pel histogram is then subjected to a linear regression analysis. A row sum, a row squared sum, a column sum, a column squared sum, and a row multiplied by column sum are generated. Each position's contribution to the sums is weighted by the value at that position. When the summation is complete, these sums are used to calculate the best-fit line's slope and intercept (with respect to the Y-axis), as well as a correlation coefficient for the regression. The calculation of these quantities from such sums is well known to one skilled in the art.

If the characters are not italicized, the best-fit line's slope (with respect to the Y-axis) will be close to zero. Accordingly, the calculated slope is compared to a predetermined threshold value to determine if the selected character set is italicized. If the slope exceeds the threshold, the selected character set is determined to be italicized. Otherwise, the text is considered non-italicized.

In the example embodiment, once a result is achieved, the preclassification portion corrects each italicized character to account for the rightward slant. The corrected characters are sent to a feature extraction portion 58. The feature extraction portion 58 extracts data from the input image. The feature data is then sent to a classification portion 60.

It should be noted that other methods of accounting for the italicized characters could be used within the scope of the invention. For example, the result from the preclassification portion 56 may be used to correct the feature data itself prior to classification. The preclassification result could also be used to select between alternate classifiers, with one classifier reserved for identifying italicized characters.

Returning to the example embodiment, in the classification portion 60, the feature data is related to the most likely output character class, and a confidence value is determined as to whether the image is a member of the selected class. This is accomplished by a statistical or neural network classifier. The confidence value 36 provides an external ability to assess the correctness of the classification.

The present invention depends on several assumptions to detect italicized text. To begin with, the italicization must be uniform. The regression described above determines the best-fit line's slope over a set of characters. If the selected character set consists of both italicized and standard characters, the method will incorrectly categorize a portion of the characters regardless of the result. Accordingly, care is necessary in selecting text blocks for analysis.

Secondly, the selected character set must be diverse. Where the characters of the set are insufficiently diverse, the slant will be influenced by the slant of the represented characters as opposed to the posture of the character set. The amount of left-edge slant within both the standard and italic character sets varies considerably, from the rightward slant of a "V" to the leftward slant of an "A." Accordingly, the threshold used to determine if a group of letters is italicized is derived from an average expected slant for each group. Where a group of characters is substantially uniform, this threshold is not useful in determining the posture of the character set.

Finally, the selected character set must be of sufficient size to allow for an effective regression analysis. The required size varies with the type and diversity of characters represented within the set. Generally, the number of characters present in a postal address will be sufficient for analysis, if they are sufficiently diverse.

Various threshold comparisons can be used to check the validity of these assumptions. For example, if the selected character set meets the assumptions described above, the x-intercept will fall within a predetermined range. This range can be determined by examining the data the program is expected to encounter during run-time operation. Where the calculated x-intercept falls outside this range, the selected characters likely failed to meet the above assumptions.

The calculated slope may also serve as an indication of a flawed assumption. If all of the assumptions are met, the slope should be within a predetermined range of zero. Again, this range is determined by examining the data the program is expected to encounter during run-time operation. An errant slope value is another sign of faulty data.

Finally, the correlation coefficient of the regression can provide information as to its validity. A correlation coefficient is a measure of how well the best-fit line fits the data points. A value of zero indicates no correlation, while values approaching positive or negative one indicate a "perfect" fit. Thus, if our assumptions are correct, the absolute value of the correlation coefficient should be close to one. A particular acceptance threshold would need to be determined for the expected data. Note that as the slope approaches zero or infinity, the correlation coefficient becomes untrustworthy. It is thus checked after the slope is checked.

FIG. 3 illustrates the process of scanning the left-edge of each character to obtain the position data. The process 100 begins at step 102. The process then proceeds to step 104, where the pel histogram is cleared. The process then advances to step 106, where the program determines if any characters are available for scanning. If so, the process proceeds to step 108, where the character is imported from the list.

The program then advances to step 110 where the program determines if there any rows to scan. If not, the program returns to step 106 to search for another character. If unscanned rows remain, the process advances to step 112 where the program imports a row for analysis. The process then advances to step 114, where the program searches the row for the left-most dark pixel. The process continues at step 116, where the program determines if a dark pixel is present in the row. If not, the process returns to step 110 to search for an unscanned row. If a pixel is found, the process advances to step 118, where the pel histogram is incremented to reflect a new pixel at that position. The program then returns to step 110 to search for an unscanned row.

Figure 4:
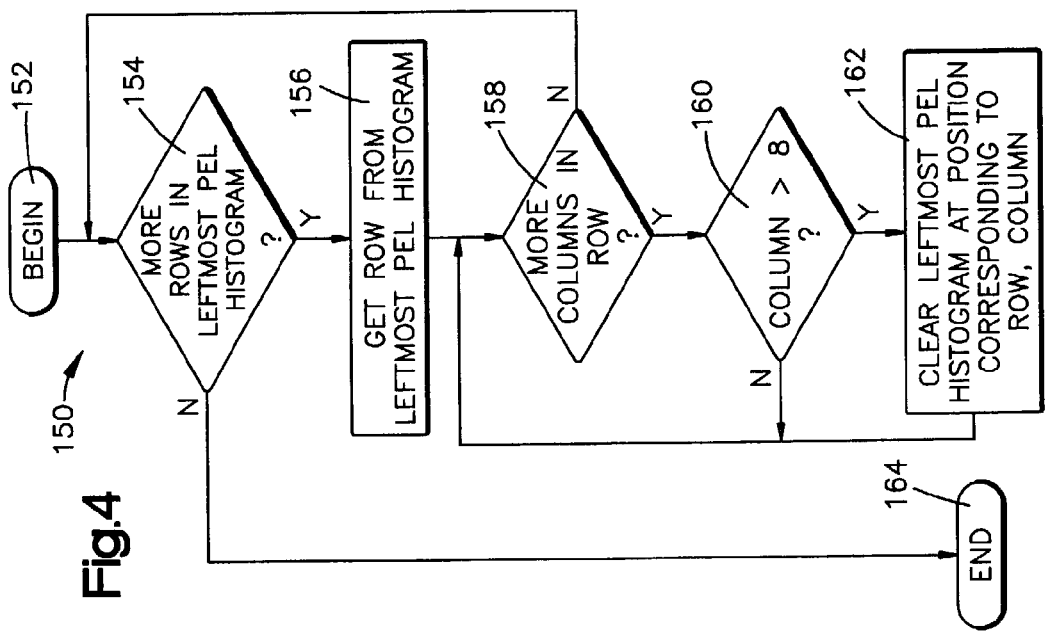
FIG. 4 is a flow diagram illustrating an example process of filtering unhelpful data from the pel histogram.

Returning to the determination at step 106, if no additional characters are found, the process terminates at step 120. The acquired data within the pel histogram are then filtered to eliminate data that are not helpful for the categorization process. An example of this filtering process is illustrated in FIG. 4.

In the example below, it is assumed that the normalized characters, and thus the corresponding pel histogram, have sixteen pixel columns. It is further assumed that the selected filtering technique eliminates all data points within the pel histogram with a column value greater than one-half the total. These assumptions are made merely for the sake of example; other character sizes and filtering techniques may be used within the present invention.

The filtering process 150 begins at step 152. The process then advances to step 154, where the program determines if any unprocessed rows remain in the pel histogram. If rows remain, the process then advances to step 156, where the program imports a row from the pel histogram. The process continues at step 158, where the program determines if there are any column positions remaining in the row to be analyzed. If not, the process returns to step 154 to search for an unprocessed row. If so, the process advances to step 160 to determine if the column position number is greater than eight.

If the column position number is less than or equal to eight, the process returns to step 158 to determine if more column positions remain for analysis. If the column number is greater than eight, the process advances to step 162, where the pel histogram entry for the selected row and column is cleared. The process then returns to step 158 to determine if more column positions remain for analysis.

Figure 5:
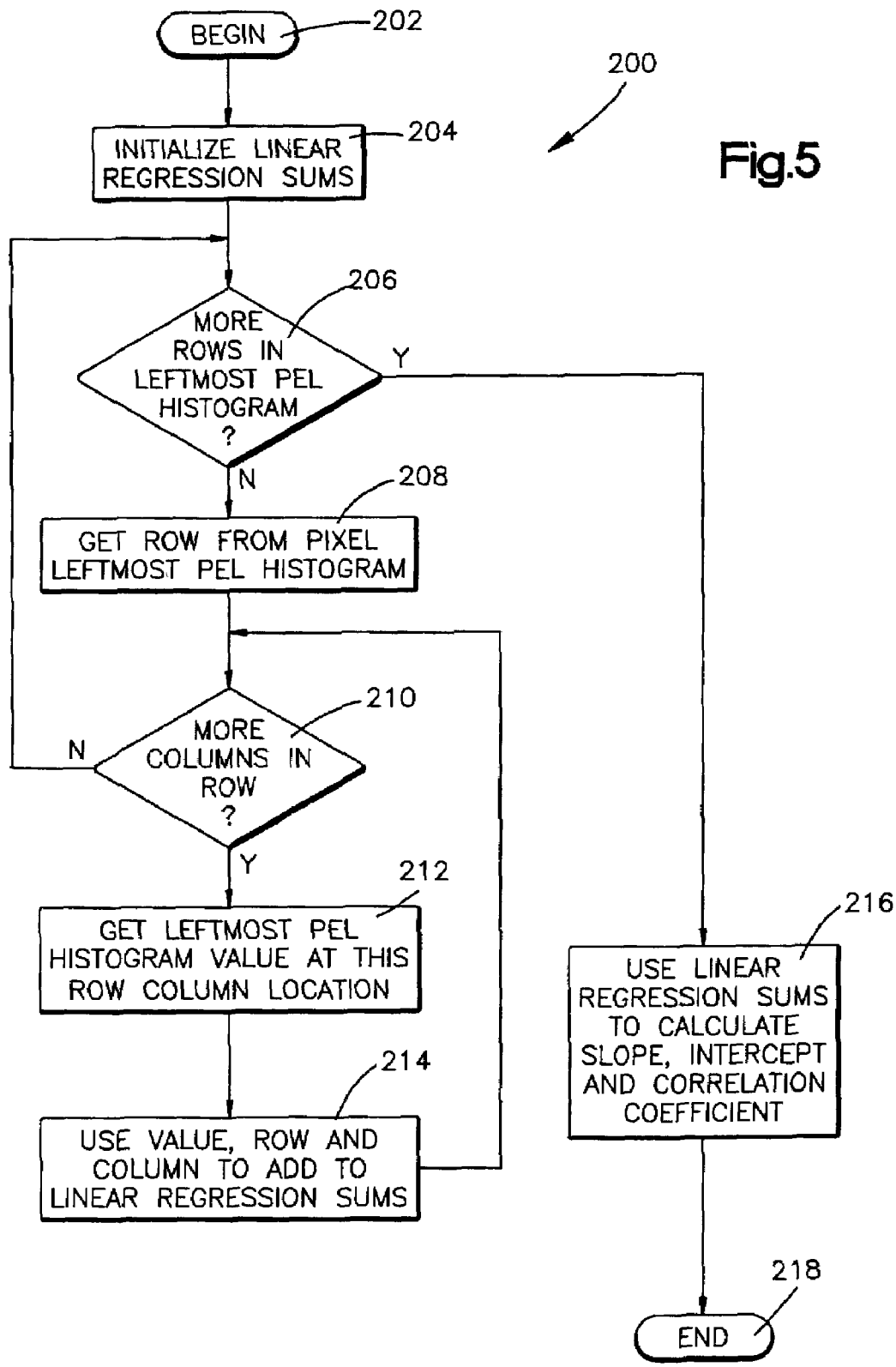
FIG. 5 is a flow diagram illustrating an example regression process.

Returning to the determination at step 154, if no additional unprocessed rows are found, the process terminates at step 164. The remaining data is then subjected to a linear regression analysis to determine a representative slope for the set of characters. An example regression process is illustrated in FIG. 5.

The regression process 200 begins at step 202. The process then advances to step 204. At step 204, the program initializes the linear regression sums. The linear regression sums are the sums of various quantities over each position in the pel histogram, weighted by the recorded value at that position. Useful quantities include the row and column numbers at each position, the respective squares of the row and column numbers, and the product of the row and column numbers.

After the linear regression sums are initialized, the process advances to step 206 where the program determines if additional rows are present for processing in the pel histogram. If unprocessed rows remain, the process advances to step 208, where the program imports a row from the pel histogram. The process then advances to step 210. At step 210, the program determines if column positions remain in the row to be summed. If all column positions have been included in the sums, the process returns to step 206 to search for another unprocessed row. If column positions remain that have not been included in determining the linear regression sums, the process continues to step 212.

At step 212, the program retrieves the value stored at the position in the pel histogram corresponding to the selected row and column. As discussed above, the value at this point will be equal to the number of left-edge pixels found at this position in the analysis of the normalized characters. The process then advances to step 214. At step 214, the program adds appropriately weighted row and column values. Specifically, the column value, the row value, their product, and their respective squares are multiplied by the value recorded at that position in the pel histogram and added to the appropriate linear regression sum. After the values are added to the sum, the process returns to step 210 to determine if unprocessed columns remain in the row.

Returning to the determination at step 206, if no additional unprocessed rows are found, the process proceeds to step 216. At step 216, the linear regression sums are used to calculate the slope and intercept for a best-fit line (with respect to the Y-axis), as well as a correlation coefficient for the regression. The calculation of these quantities is well known to one skilled in the art. After the calculation, the process terminates at step 218.

FIG. 6 illustrates the verification process for the calculated regression values. The process 250 begins at step 252.

The process then advances to step 254, where the program determines if the calculated slope falls within a predetermined range. This range is determined by examination of data similar to that the program is expected to encounter. If the slope does not fall within this range, the selected character set likely does not meet the assumptions necessary for the regression analysis. Accordingly, if the slope does not fall within this range, the program reports an error, and the process terminates at step 256.

If the calculated slope falls within accepted ranges, the program advances to step 258, where the program determines if the x-intercept falls within a predetermined range. Again, the acceptable range is calculated by examining data similar to data the program is expected to encounter. If the x-intercept does not fall within the predetermined range, the selected character set likely fails to meet the necessary assumptions for the regression analysis. Thus, the program reports an error, and the process terminates at step 256.

If the x-intercept falls within acceptable parameters, the process advances to step 260. At step 260, the program determines if the slope is less than a predetermined threshold. If the slope is sufficiently small, the program reports that the selected character set is not italicized, and the process terminates at step 262. If the slope exceeds the threshold, the process advances to step 264, where the calculated correlation coefficient is compared to a predetermined threshold.

If the absolute value of the correlation coefficient is less than a predetermined threshold, it is likely that the selected character set does not meet the necessary assumptions for the regression analysis. Thus, the program reports an error, and the process terminates at step 256. If the correlation coefficient exceeds the predetermined threshold, the program reports that the selected character set is italicized, and the process terminates at step 266.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, I claim:

1. A method of recognizing italic text in a optical character recognition system comprising:
   creating a plurality of digital images of alphanumeric characters from a block of text, each comprising a plurality of rows of digital pixels;
   preprocessing the digital images such that each image is normalized to equal size and the pixels within each image have a first value or a second value;
   determining the position of the left-most pixel with a first value in each row for each image;
   recording the position of each left-most pixel with a first value as a ordered pair including the row number and ordinal position within the row;
   calculating a best fit line and a corresponding slope for the ordered pairs via linear regression; and
   comparing the calculated slope to a predetermined threshold so as to determine if the block of text comprises italicized text.

2. A method as set forth in claim 1 wherein the pixels within the digital images are assigned a value based upon the original brightness of the pixel.

3. A method as set forth in claim 1 wherein the method further comprises the step of altering the digital character images to remove an italic tilt where the absolute value of the slope exceeds a threshold.

4. A method as set forth in claim 1 wherein the method further comprises the step of creating a plurality of digital images from the original block of text via an alternate method specific to italicized text where the slope exceeds the threshold.

5. A method as set forth in claim 1 wherein the method further comprises the step of recognizing the alphanumeric characters via a method specific to italicized characters where the slope exceeds the threshold.

6. A computer program product implemented on a computer readable medium and operative in a data processing system for detecting italicized text comprising:
   an image acquisition portion capable of creating a plurality of digital characters of alphanumeric images from a block of text, each comprising a plurality of rows of digital pixels;
   a preprocessing portion that preprocesses the digital images such that each image is normalized to equal size and the pixels within each image have a first value or a second value; and
   a preclassification portion that determines the position of the left-most pixel with a first value in each row for each image, records the position of each left-most pixel with a first value as a ordered pair including the row number and ordinal position within the row, calculates a best-fit line with a corresponding slope for the ordered pairs through linear regression, and compares the calculated slope to a predetermined threshold so as to determine if the block of text comprises italicized text.

7. A computer program product as set forth in claim 6 wherein the pixels within the digital images are assigned a value based upon the original brightness of the pixel.

8. A computer program product as set forth in claim 6 wherein the preclassification portion alters the digital character images to remove an italic tilt where the absolute value of the slope exceeds a threshold.

9. A computer program product as set forth in claim 6 wherein the image acquisition portion creates a plurality of digital images from the original block of text via an alternate method specific to italicized text where the slope exceeds the threshold.

10. A computer program product as set forth in claim 6 wherein the computer program product further comprises a classification portion that recognizes the alphanumeric characters via a method specific to italicized characters where the slope exceeds the threshold.

* * * * *